United States Patent
Jayaraman et al.

(10) Patent No.: US 12,481,566 B2
(45) Date of Patent: Nov. 25, 2025

(54) PROGRAM RECOVERY

(71) Applicant: HEWLETT PACKARD ENTERPRISE DEVELOPMENT LP, Spring, TX (US)

(72) Inventors: Aswin Jayaraman, Karnataka (IN); Sankar Ramasamy, Karnataka (IN); Sijesh Thondapilly Balakrishnan, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 82 days.

(21) Appl. No.: 18/358,558

(22) Filed: Jul. 25, 2023

(65) Prior Publication Data
US 2025/0036533 A1 Jan. 30, 2025

(51) Int. Cl.
*G06F 11/14* (2006.01)
(52) U.S. Cl.
CPC .... *G06F 11/1469* (2013.01); *G06F 2201/865* (2013.01)
(58) Field of Classification Search
CPC .............. G06F 11/1469; G06F 2201/865
USPC ........................................... 707/676
See application file for complete search history.

(56) References Cited

U.S. PATENT DOCUMENTS

| | | | |
|---|---|---|---|
| 5,675,769 A * | 10/1997 | Ruff | G06F 3/0607 |
| | | | 711/170 |
| 10,437,620 B2 | 10/2019 | Li et al. | |
| 10,944,778 B1 | 3/2021 | Golan et al. | |
| 2006/0080656 A1 | 4/2006 | Cain et al. | |
| 2008/0184068 A1 * | 7/2008 | Mogi | G06F 11/1469 |
| | | | 714/15 |
| 2020/0074084 A1 | 3/2020 | Dorrans et al. | |
| 2021/0117549 A1 | 4/2021 | Mandagere et al. | |
| 2021/0133326 A1 | 5/2021 | Wu et al. | |
| 2021/0133327 A1 | 5/2021 | Wu | |
| 2021/0133328 A1 | 5/2021 | Wu | |
| 2021/0334175 A1 * | 10/2021 | Nadiminti | G06F 11/2094 |
| 2021/0334386 A1 | 10/2021 | Alghamdi et al. | |
| 2024/0045712 A1 * | 2/2024 | MacFarlane | G06F 9/4856 |

FOREIGN PATENT DOCUMENTS

WO  2022/229731 A1  11/2022

* cited by examiner

*Primary Examiner* — Hares Jami
(74) *Attorney, Agent, or Firm* — Trop, Pruner & Hu, P.C.

(57) ABSTRACT

In some examples, a system receives a request to recover a program. The system accesses metadata associated with a recovery copy of information for the program, and determines, based on the metadata, a compatibility of a storage arrangement of data in the recovery copy with the program. The system determines whether to fully recover the program using the recovery copy or to partially recover the program based on the determined compatibility.

18 Claims, 5 Drawing Sheets

PROGRAM RECOVERY

BACKGROUND

A program that is executable in a computer system can employ various program components, such as an operating system (OS), an application, or other machine-readable instructions. The program can also access data that has a specific storage arrangement, such as a storage arrangement associated with a specific version of a file system or a storage arrangement associated with a specific version of a database server.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A program executing in a system may become corrupted or experience other types of anomalies that may cause faulty or sub-optimal performance of the program. The program uses a collection of program components, and the program also accesses data that is stored in a storage system. The anomalies associated with the program may be caused by errors in the data and/or a corruption or other issues of any of the collection of program components. In an example, the program is a virtual machine (VM). In other examples, other types of programs may be employed.

In response to detecting an anomalous behavior of the program, a recovery procedure may be initiated. The recovery procedure may recover the program using a recovery copy (e.g., a backup copy or a snapshot) that includes information for the program. The information for the program can include machine-readable instructions of the program components used by the program and data accessed by the program. A recovery of the program using a recovery copy may provide a full restore of the program in which the program is recovered in its entirety to a state of the program that existed at the time the recovery copy was created (the full restore of the program includes restoring both machine-readable instructions of program components used by the program and data accessed by the program). For example, if the program is a VM, then a full restore recovers the VM including its operating system (OS), application program(s), and data to a state of the VM that existed at the time the recovery copy was created.

When fully recovering a program from a recovery copy, a compatibility issue may arise relating to a storage arrangement of data used by the program. A current version of the program may use data that is according to a particular storage arrangement, such as a storage arrangement associated with a specific version of a file system or a storage arrangement associated with a specific version of a database server. Data stored in a recovery copy may be according to an older storage arrangement (e.g., for an older version of a file system or an older version of a database server) that is incompatible with a current version of the program. As a result, fully restoring the program from the recovery copy may produce data in an incompatible storage arrangement that cannot be accessed by the current version of the program, which can result in faulty operation of the program. For example, the program may crash or otherwise return an error.

Additionally, fully recovering a program to a prior state using a recovery copy may result in restoring prior versions of program components used by the program. Such prior versions of program components may be versions prior to application of update patches that are to fix errors or security issues associated with the program components. The program recovered to the prior state may thus be in a vulnerable or faulty state until the missing update patches are applied, which can take some amount of time. The total time for recovering a program using a recovery copy includes the time associated with restoring the program from the recovery copy, and the time associated with applying any update patches. If the total recovery time is large, then the program being recovered may not be available for a relatively long time.

In accordance with some implementations of the present disclosure, a selective restoration engine is able to dynamically select one of multiple different program restoration techniques to use depending on any or some combination of the following factors: a compatibility of a storage arrangement of data in a recovery copy, or an amount of time estimated for application of one or more update patches to program components after recovery from the recovery copy.

The selective restoration engine determines a compatibility of a storage arrangement of data in the recovery copy with the program, and determines whether to fully recover the program using the recovery copy or to partially recover the program by restoring just data for the program based on the determined compatibility. In this way, the selective restoration engine is able to avoid or reduce the likelihood of recovering data to a prior storage arrangement that may be incompatible with a current version of the program. If data in an incompatible storage arrangement is recovered from the recovery copy, then a program fault may occur after recovery. A delay in availability of the program after recovery may result, where the delay may include an amount of time for converting or exporting the data in the incompatible storage arrangement to a compatible storage arrangement.

If the selective restoration engine detects that the current version of the program is incompatible with the storage arrangement of data in the recovery copy, then instead of fully recovering the program from the recovery copy which would result in data with an incompatible storage arrangement, the selective restoration engine performs a partial recovery of the program in which the data is recovered from the recovery copy, without recovering other aspects of the program, such as a file system or database server used by the program. Restoring a file system or database server from the recovery copy would cause data to be recovered with a storage arrangement of the restored file system or database server, which may be incompatible with the current version of the program. On the other hand, recovering just the data involves copying raw data from the recovery copy without the corresponding storage arrangement. For example, files can be copied from the recovery copy without arranging the files according to a file system represented in the recovery copy. As used here, "raw data" in a recovery copy refers to data that does not have any specific storage arrangement as defined by a file system, a database server, or any other type of data management module.

A "current version" of a program refers to the version of the program that was executing in a system prior to a determination that a program recovery procedure is to be performed. A "storage arrangement" of data refers to how the data is formatted or otherwise arranged. For example, data may be arranged in files and directories of a file system. Over time, a file system may be updated, starting at an initial version and progressing through subsequent versions of the file system. Additional features may be added to new versions of a given type of file system. Alternatively, a file system may be updated to fix bugs or other issues. As a file system is updated, programs that use the file system may also be updated, such as to make use of new features or to otherwise interact with the new version of the file system. A program updated to support a newer version of the file system may not be able to use data stored using an older version of the file system. The older version of the file system would be considered an incompatible file system for the program.

In some cases, storage arrangements may be changed by changing the type of file system that stores data. For example, a program may initially use a first type of file system. At a later point in time, a decision may be made to change the file system to a different type of file system, at which point the program is also updated to use data stored in the different type of file system. The program updated to use data stored in the different type of file system would not be able to use data stored in the first type of file system. The first type of the file system would be considered an incompatible file system for the program. Examples of different types of file systems can include any or some combination of the following: a file allocation table (FAT) file system (e.g., a FAT12 file system, a FAT16 file system, a FAT32 file system, or another version of the FAT file system), a New Technology File System (NTFS), a Resilient File System (ReFS), a Hierarchical File System (HFS), a High Performance File System (HPFS), an Extended File System (e.g., an ext2 file system, an ext3 file system, an ext4 file system, or another version of the Extended File System), a Virtual Machine File System (VMFS), a flash file system used for a flash memory, or another type of file system.

In other examples, a storage arrangement of data can include data stored according to a data model of a given database server. Different database servers (which may include different database management system (DBMS) programs) can employ different data models. Examples of different data models include any or some combination of the following: a relational database model, an object-oriented database model, a hierarchical database model, a network database model, or another data model. If a data model of a database server is updated to a newer version, or if a first type of database server (that uses a first data model) is replaced with a second type of database server (that uses a second data model different from the first data model), then data storage arrangement incompatibility may result if data according to a prior data model is recovered from a recovery copy.

In further examples, a storage arrangement of data can include a storage arrangement used by a map-reduce system that stores data according to a map-reduce model (e.g., according to a Hadoop file system). Other types of storage arrangements of data may be employed in other examples.

In further implementations of the present disclosure, a selective restoration engine may alternatively or additionally select a program recovery technique to use for recovering a program based on an amount of time involved in applying updates of the program after recovery, such as based on applying update patches. The selective restoration engine identifies one or more update patches to apply after recovering a program using a recovery copy, and estimates, based on determined one or more update patches to apply, a total recovery time including a time to recover the program from the recovery copy and a time to apply the one or more update patches. The selective restoration engine determines, based on the total recovery time, whether to fully recover the program using the recovery copy or to perform a partial recovery of the program.

An "update patch" when applied can incrementally change a program component used by a program to fix errors or security issues associated with the program component. Alternatively, an "update patch" when applied can replace a first type of program component with a different type of program component (e.g., replace a first type of OS with a second type of OS, replace a first type of application program with a second type of application program, etc.). Different types of program components (e.g., OSes, application programs, etc.) may be provided from different vendors or may operate according to different protocols (e.g., open-source protocols, protocols defined by standards bodies, proprietary protocols, etc.).

A program recovery technique selected can be based on both (1) the compatibility check for the storage arrangement of the data and (2) the determination of the amount of time involved in applying updates. In different examples, a program recovery technique selected can be based on just the compatibility check for the storage arrangement of the data, or alternatively, based on just the determination of the amount of time involved in applying updates.

Figure 1:
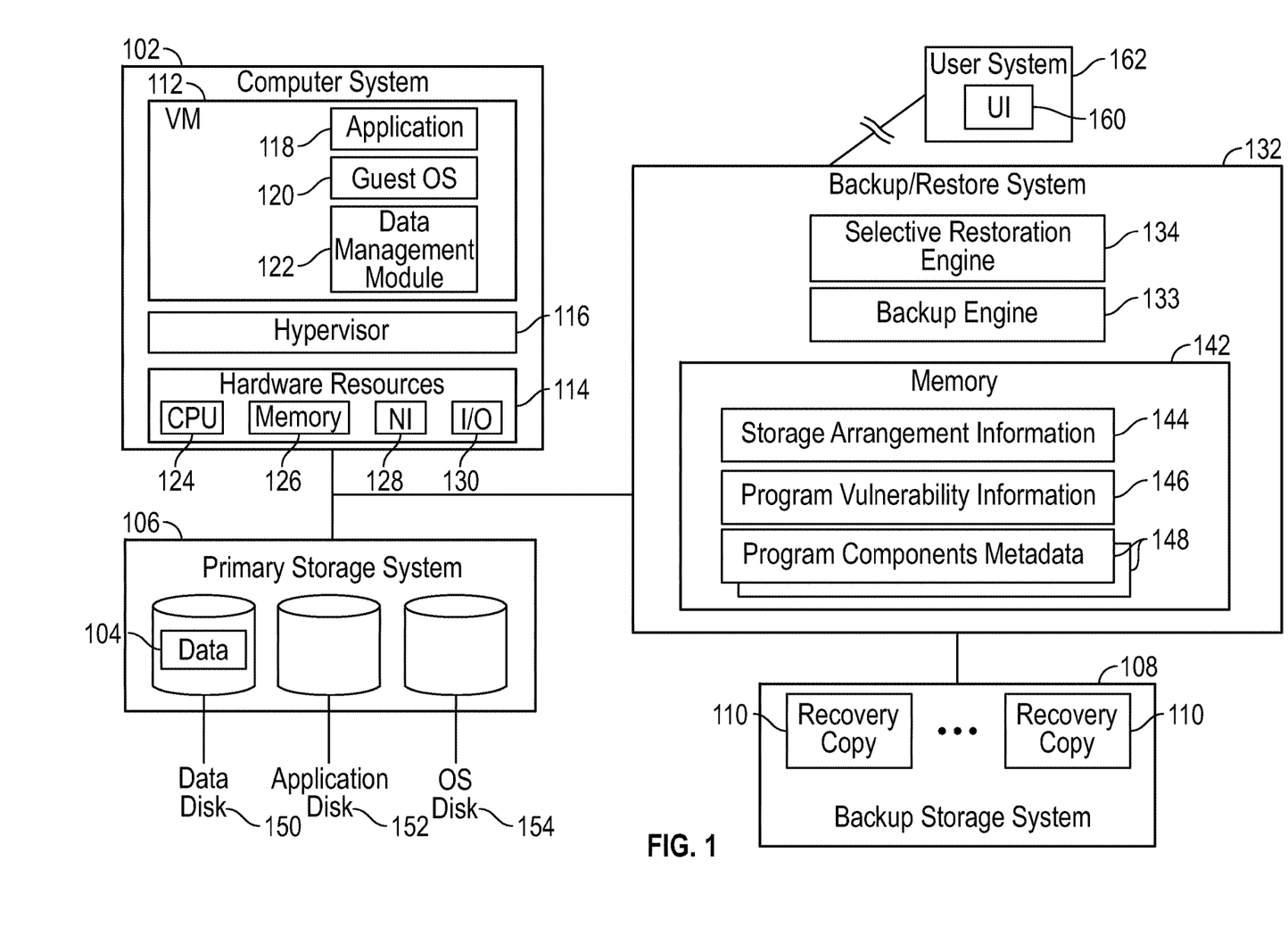
FIG. 1 is a block diagram of an arrangement that includes a program restoration engine according to some examples.

FIG. 1 is a block diagram of an example arrangement that includes a computer system 102 that is able to access a primary storage system 106. A computer system can include any or some combination of the following: a desktop computer, a notebook computer, a tablet computer, a server computer, a smartphone, a game appliance, an Internet-of-Things (IoT) device, a vehicle, or any other type of electronic device. A storage system can include a collection of storage devices. As used here, a "collection" of items can refer to a single item or multiple items. Thus, a collection of storage devices can include a single storage device or multiple storage devices. Examples of storage devices can include any or some combination of the following: a disk-based storage device, a solid-state drive, a memory such as a dynamic random access memory (DRAM) device or a static random access memory (SRAM) device, or other types of storage devices.

Although FIG. 1 shows the primary storage system 106 as being separate from the computer system 102, in other examples, the primary storage system 106 can be part of the computer system 102. Also, in other examples, multiple computer systems are able to access data in the primary storage system 106.

The primary storage system 106 is the storage system that is actively used by programs running in the computer system 102 during execution of the programs. The primary storage system 106 may be different from a backup storage system 108, which stores one or more recovery copies 110. The backup storage system 108 may be located at a different geographic location from the primary storage system 106. In other examples, the backup storage system 108 and the primary storage system 106 can be located at the same geographic location. In further examples, the recovery copies 110 may be stored in the primary storage system 106, and the backup storage system 108 may be omitted.

A "recovery copy" can refer to any copy of information that can be used to recover a state of a program, such as a program in the computer system 102. The state of the program can refer to information of program components used by the program and data used by the program. More specifically, a recovery copy can store both machine-readable instructions and data that can be used to recover a program to a prior state.

More generally, a recovery copy created for a program can refer to a recovery copy created for a collection of programs (a single program or multiple programs). Restoring a program from a recovery copy can refer to restoring a collection of programs from the recovery copy.

A recovery copy can include a backup copy or a snapshot. A backup copy is a copy of the entirety of information (machine-readable instructions and data) of the program. Whenever a backup copy is taken, the entirety of the information of the program is copied to the backup copy. A snapshot includes a point-in-time copy of changes in the information of the program. A snapshot taken at a given point in time includes changed information (changed machine-readable instructions and data) relative to a most recent recovery copy, which can be a full backup copy or a prior snapshot.

An example of a program that executes in the computer system 102 is a virtual machine (VM) 112. A VM includes a virtual computing environment that makes use of emulated hardware resources of the computer system 102. The computer system 102 includes hardware resources 114. A hypervisor 116 (also referred to as a virtual machine monitor or VMM) in the computer system 102 performs emulation of the hardware resources 114, and presents the emulated resources for use by the VM 112 (and other VMs if present). The hypervisor 116 also controls management of VMs in the computer system 102, including starting a VM, modifying a VM, or tearing down a VM. Although just one VM is depicted in FIG. 1, in other examples, multiple VMs may execute in the computer system 102.

The present discussion refers to a VM as an example of a program that employs various program components and data 104 in the primary storage system 106. The program components used by the VM 112 include an application program 118, a guest OS 120, and a data management module 122. Examples of the application program 118 can include any or some combination of the following: a web server application (to provide web functionalities), a security program (to provide protection against security risks such as those presented by malware), or any other type of application program. The VM 112 can execute multiple application programs. In other examples, other types of programs can make use of various program components.

The data management module 122 is to manage access of the data 104 that is stored according to a specified storage arrangement in the primary storage system 106. In some examples, the data management module 122 is a file system that stores the data 104 in the form of files and directories. Note that the file system may be part of the guest OS 120. In other examples, the data management module 122 is a DBMS program that stores data according to a data model in a database including database tables or other database objects. In yet further examples, the data management module 122 is a map-reduce program that stores data according to a map-reduce model (e.g., a Hadoop file system). Other types of data management modules may be employed in other examples.

The hardware resources 114 in computer system 102 can include any or some combination of the following: a central processing unit (CPU) 124 (including one or more processors), a memory 126 (including one or more memory devices), a network interface 128 to allow the computer system 102 to communicate over a network, an input/output (I/O) device 130 that provides various I/O functions, or other hardware resources.

The primary storage system 106 includes a data disk 150 (that stores the data 104 accessed by the VM 112), an application disk 152, and an OS disk 154. A "disk" as used herein can refer to a storage region of a storage medium of the primary storage system 106. The storage medium can include any or some combination of the following: disk-based storage devices, solid state drives, memory devices, or other types of storage devices. A storage region that makes up the disk can include any portion of one or more storage devices. The disks 150, 152, and 154 are presented as virtual disks by the hypervisor 116 to the VM 112. Note that there may be multiple data disks, multiple application disks, and/or multiple OS disks.

The data disk 150 stores the data 104 (e.g., files of a file system, database tables of a database server, data for a map-reduce system, etc.) used by the VM 112. The application disk 152 stores a code image (including machine-readable instructions) of the application program(s) 118 (and possibly the data management module 122) that execute in the VM 112. The VM 112 can load the machine-readable instructions of the application program(s) 118 from the application disk 152. The OS disk 154 stores a code image (including machine-readable instructions of the guest OS 120). The VM 112 can load the machine-readable instructions of the guest OS 120 from the application disk 154.

A backup/restoration system 132 includes a backup engine 133 that manages backup of a state of the computer system 102 to a recovery copy 110, which can be stored in the backup storage system 108 (or alternatively in the primary storage system 106 if the backup storage system 108 is omitted). The backup/restoration system 132 further includes a selective restoration engine 134 that dynamically applies one of multiple different types of program restoration techniques based on one or more factors.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

The backup engine 133 can create a recovery copy 110 in response to any of various events. In some examples, an event that triggers creation of a recovery copy 110 is a time-based event. For example, the backup engine 133 can create a recovery copy at specified time points (e.g., periodic time points). In such examples, the backup engine 133 periodically creates recovery copies 110 to backup corresponding states of the VM 112 at different points in time. In other examples, the backup engine 133 can create a recovery copy 110 in response to a different event, such as an explicit backup request, an event associated with a power transition of the computer system 102, or any other event.

The selective restoration engine 134 according to some examples of the present disclosure is able to dynamically select one different program restoration techniques depending on one or more factors. The program restoration techniques can include a first program restoration technique in which the selective restoration engine 134 fully recovers a state of the VM 112 from a recovery copy 110. In some examples where multiple recovery copies 110 are available, the selective restoration engine 134 can select one of the recovery copies 110 for use in performing recovery of the VM 112 based on which recovery copy 110 would be most efficient (discussed further below).

A second program recovery technique performs a partial recovery of the VM 112, such as by recovering the data (but not machine-readable instructions such as the application program 118, the guest OS 120, and the data management module 122) from a recovery copy 110. In further examples, partial recovery of the VM 112 can recover the data and machine-readable instructions of the application program 118 (but not the machine-readable instructions of the guest OS 120 and/or the data management module 122) from a recovery copy 110. More generally, partial recovery of the VM 112 can recover a subset (less than all) of the information in a recovery copy 110.

The backup/restoration system 132 includes a memory 142 that stores various information that can be used by the selective restoration engine 134. As examples, the memory 142 can include storage arrangement information 144 regarding a current storage arrangement of data used by the VM 112 (e.g., a version of a file system, a version of a database server, a version of a map-reduce system, or a version of another data management module). The storage arrangement information 144 can be obtained from the VM 112, such as by the backup engine 133 or another entity of the backup/restore system 132, and stored in the memory 142.

The memory 142 can also store program vulnerability information 146 that indicates vulnerabilities of different versions of the VM 112. The program vulnerability information 146 includes information relating to details of each program component (e.g., the guest OS 120 and/or application program 118) and vulnerabilities associated with each program component and information of remedial actions to apply against the vulnerabilities. An example of a remedial action to apply can include applying an update patch to fix a vulnerability. A "vulnerability" of a program component can refer to an error, security issue, or any other issue that can affect a performance of the program component. The program vulnerability information 146 can list different versions of a program component and a vulnerability of each version of the program component along with a remedial action to apply.

The program vulnerability information 146 can be populated using any of various techniques. For example, the program vulnerability information 146 may be manually updated. Alternatively, the program vulnerability information 146 can be created by any of various tools, such as the Vulnerability Tracking Notification (VTN) tool from Hewlett Packard Enterprises, the Microsoft Defender Vulnerability Management tool, or any other tool that can collect information regarding detected vulnerabilities of program components.

The memory 142 can further store program components metadata 148 for each recovery copy 110 created for the VM 112. There is one corresponding instance of the program components metadata 148 per recovery copy 110. More specifically, a first instance of the program components metadata 148 is stored for a first recovery copy 110, a second instance of the program components metadata 148 is stored for a second recovery copy 110, and so forth.

The program components metadata 148 includes information identifying the program components (e.g., the application program 118, the guest OS 120, and the data management module 122) used by the VM 112, and the version of each of the program components at the time that a respective recovery copy was created. At the time of creating a recovery copy 110, the backup engine 133 stores a respective instance of the program components metadata 148 into the memory 142. The respective instance of the program components metadata 148 includes the information of the program components at the time of creation of the recovery copy 110. The backup engine 133 can obtain the information for inclusion in the instance of the program components metadata 148 from the VM 112.

For any given recovery copy 110, the selective restoration engine 134 can determine, based on the program vulnerability information 146 and the corresponding instance of the program components metadata 148 for the given recovery copy 110, which patch updates are to be applied for the versions of the program components identified in the instance of the program components metadata 148. For example, if the instance of the program components metadata 148 for the given recovery copy 110 identifies version X of the application program 118, version Y of the guest OS 120, and version Z of the data management module 122 that are used by the VM 112 at the time of creating a corresponding recovery copy 110, then the selective restoration engine 134 can consult the program vulnerability information 146 to identify the patch updates (if any) to apply to version X of the application program 118, version Y of the guest OS 120, and version Z of the data management module 122.

In some examples, the selective restoration engine 134 can present information pertaining to each of the recovery copies 110 in a user interface (UI) 160 of a user system 162. The user system 162 can be a desktop computer, a notebook computer, a tablet computer, a smartphone, or any other type of electronic device.

The information pertaining to each of the recovery copies 110 presented in the UI 160 can include any or some combination of the following: a time that the recovery copy was created, an expiration date of the recovery copy, versions of program components in the recovery copy, last update patch applied to each program component, how many update patches are to be applied, and so forth. The information of the recovery copies 110 presented in the UI 160 can be used by a user in deciding how best to proceed with a recovery. For example, the user can select a specific recovery copy 110 to use for recovering the VM 112.

Figure 2:
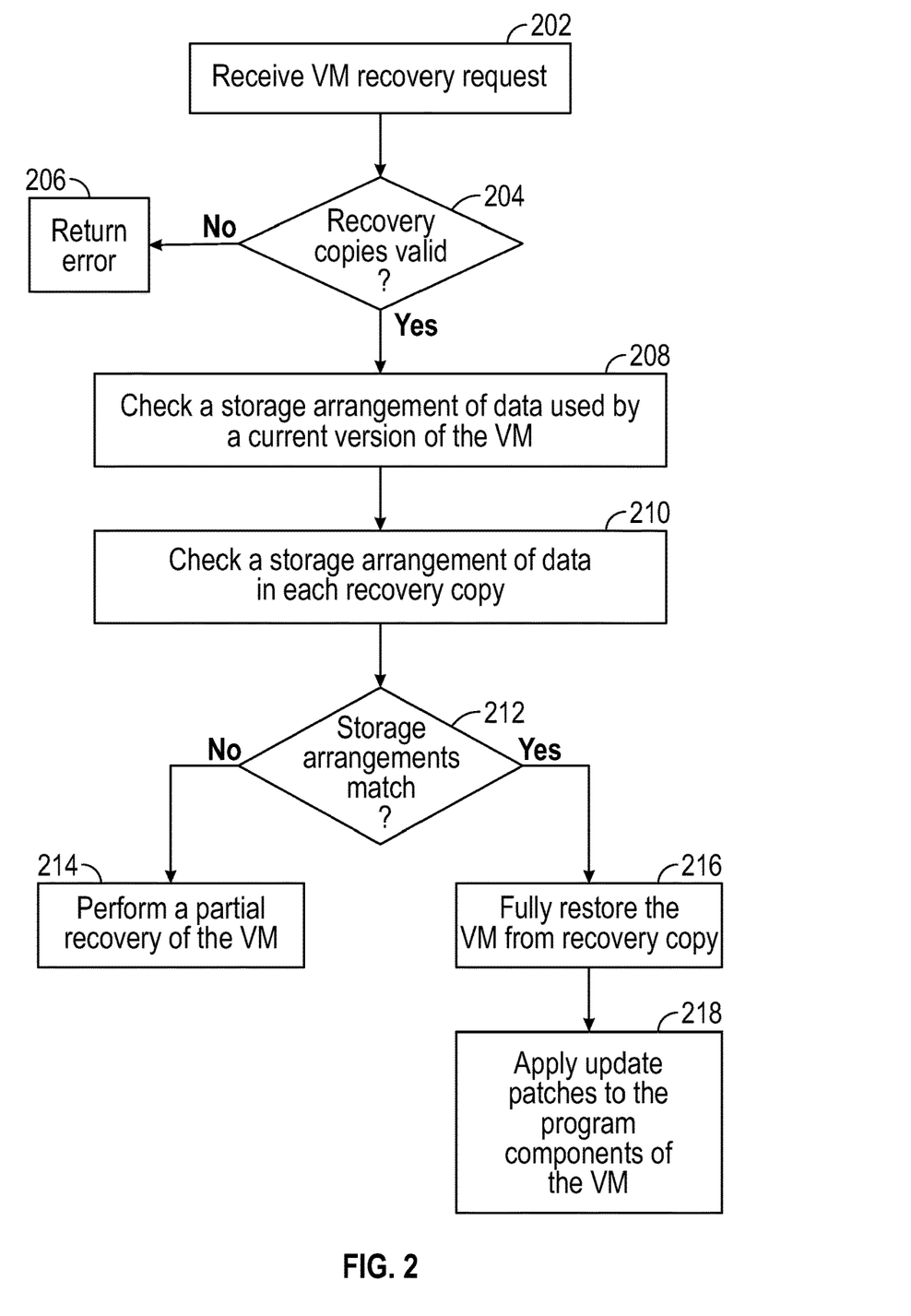
FIG. 2 is a flow diagram of a process of selecting a program recovery technique based on checking compatibility of a storage arrangement of data in a recovery copy, according to some examples.

FIG. 2 is a flow diagram of a selective restoration process that can be performed by the selective restoration engine 134 according to some examples of the present disclosure. In other examples, the tasks of FIG. 2 can be performed in a different order, some tasks may be omitted, and other tasks may be added.

The selective restoration engine 134 receives (at 202) a request to initiate a recovery of the VM 112 (or more generally, a request for recovery of a program in the computer system 102). The request can be initiated by a user or any other entity, such as a program or machine. The request to initiate the recovery can be in response to detection of an error or a fault of the VM 112.

The selective restoration engine 134 determines (at 204) whether the recovery copies 110 in the backup storage system 108 are valid. In an example, the selective restoration engine 134 can detect if the recovery copies 110 have been corrupted, such as based on a signature (e.g., a checksum, a hash value, or another value) computed based on each recovery copy 110. The selective restoration engine 134 can compare the signature computed based on a given recovery copy 110 to an expected signature. If the signatures do not match, then that indicates that the recovery copy 110 may have been corrupted. If all of the recovery copies 110 are corrupted, then the selective restoration engine 134 determines that the recovery copies 110 are not valid.

As another example, the selective restoration engine 134 can determine a compatibility of each recovery copy 110. Due to a configuration change of the backup/restoration system 132, recovery copies 110 produced prior to the configuration change may no longer be usable (i.e., the prior recovery copies 110 are incompatible with the new configuration of the backup/restoration system 132). If all of the recovery copies 110 are incompatible, then the selective restoration engine 134 determines that the recovery copies 110 are not valid.

If the selective restoration engine 134 determines (at 204) that the recovery copies 110 are not valid, the selective restoration engine 134 returns (at 206) an error, and the restoration process stops.

On the other hand, if the selective restoration engine 134 determines (at 204) that there is at least one valid recovery copy 110, the selective restoration engine 134 proceeds with the recovery process. The selective restoration engine 134 checks (at 208), based on the storage arrangement information 144 stored in the memory 142 (FIG. 1), a storage arrangement of the data 104 used by a current version of the VM 112 executing in the computer system 102.

The selective restoration engine 134 checks (at 210) the storage arrangement of data stored in each recovery copy 110. The selective restoration engine 134 determines (at 212) whether the storage arrangement of the data 104 indicated by the storage arrangement information 144 matches any of the storage arrangements of data in the recovery copies 110. The storage arrangement of data in a recovery copy can be determined based on accessing the instance of the program components metadata 148 associated with the recovery copy and determining a version of the data management module 122 specified by the instance of the program components metadata 148. The version of the data management module 122 provides an indication of the storage arrangement of data in the recovery copy. Determining whether the storage arrangement of the data 104 indicated by the storage arrangement information 144 matches a storage arrangement of data in the recovery copy 110 can include comparing a version of the data management module 122 specified by the storage arrangement information 144 to the version of the data management module 122 specified by the respective instance of the program components metadata 148 for the recovery copy 110.

If the storage arrangement of the data 104 indicated by the storage arrangement information 144 does not match the storage arrangement of data in any of the recovery copies 110, then the selective restoration engine 134 makes a determination that the storage arrangement of data in the recovery copies 110 is incompatible with the current version of the VM 112. In response to determining that each recovery copy 110 includes a storage arrangement of data that is incompatible with the current version of the VM 112, the selective restoration engine 134 performs (at 214) a partial recovery of the VM 112 by recovering just the raw data from a recovery copy 110. If multiple recovery copies are available, then the raw data of the most recent recovery copy 110 can be recovered in some examples.

Note that a partial recovery of the VM 112 that copies raw data from a recovery copy 110 is possible in scenarios where the data management module 122 has not been corrupted. Thus, if the selective restoration engine 134 detects that the data management module 122 has been corrupted, then the selective restoration engine 134 would not choose to perform the partial recovery of the VM 112.

If the data management module 122 is corrupted, then a full recovery of the VM 112 would have to be performed from the recovery copy 110, followed by applying update patches to the restored VM 112 (to bring the program components used by the VM 112 to their latest versions) and converting or otherwise exporting the data to a storage arrangement that is compatible with the updated VM 112 after application of the update patches.

In further examples, the partial recovery of the VM 112 can include restoring the raw data and the application program 118 for the VM 112, but not restoring the guest OS 120 or the data management module 122.

If the selective restoration engine 134 determines (at 212) that the storage arrangement of the data 104 indicated by the storage arrangement information 144 matches a storage arrangement of data in any of the recovery copies 110, then the selective restoration engine 134 makes a determination that the storage arrangement of data in at least one recovery copy 110 is compatible with the current version of the VM 112. In response to such a determination, the selective restoration engine 134 fully restores (at 216) the VM 112 to a prior state based on the recovery copy 110. If multiple recovery copies 110 are available with compatible storage arrangements of data, then the selective restoration engine 134 can select one of the multiple recovery copies 110 to use, such as the recovery copy 110 for which the least quantity of update patches have to be applied.

After fully restoring the VM 112 from the selected recovery copy 110, the selective restoration engine 134 applies (at 218) patch updates to the program components used by the restored VM 112. After applying the patch updates, the restored VM 112 is available for use in the computer system 102.

The patch updates applied are determined by the selective restoration engine 134 based on the program vulnerability information 146 and the instance of the program components metadata 148 for the recovery copy 110 from which the VM 112 was restored.

Figure 3:
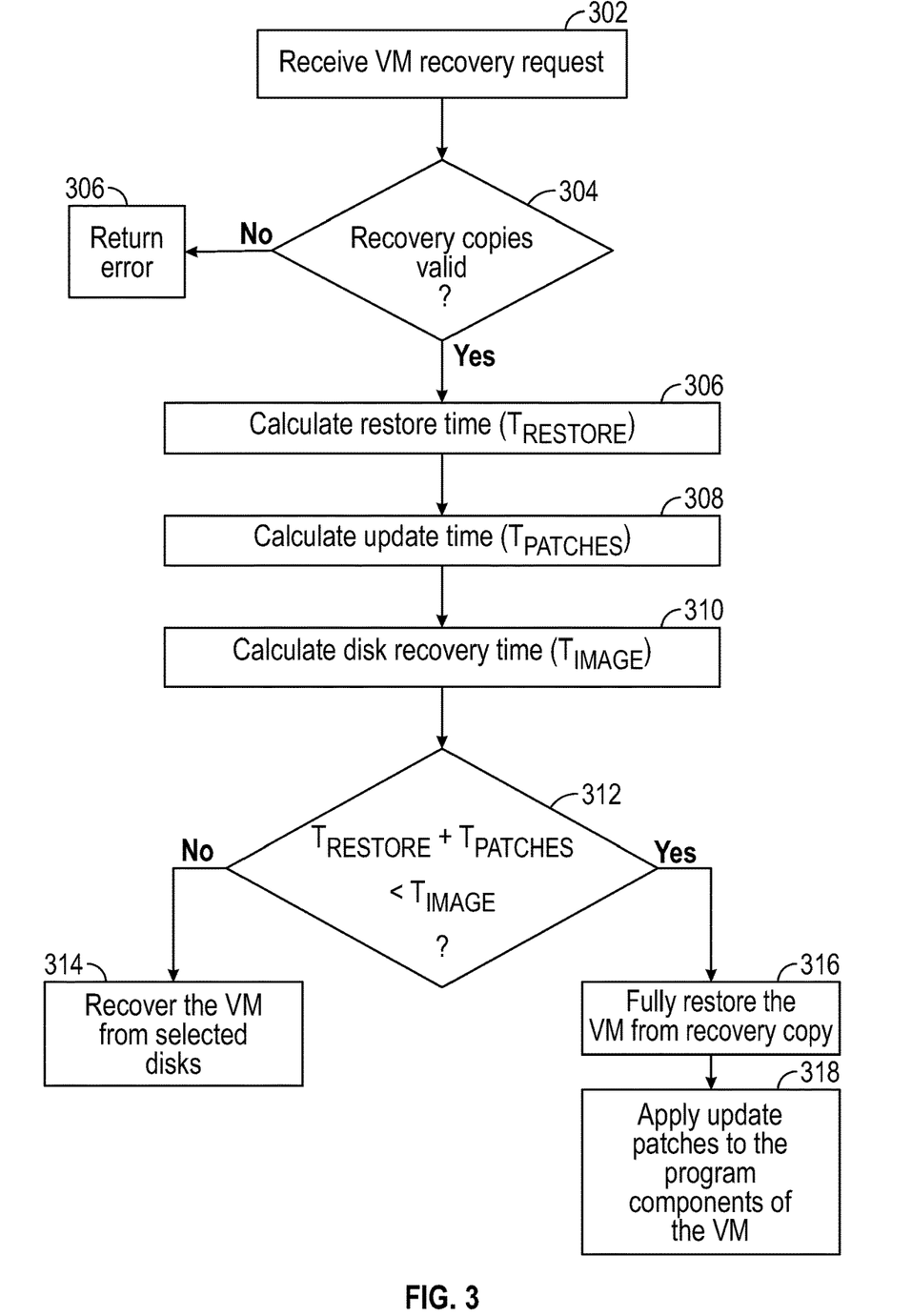
FIG. 3 is a flow diagram of selecting a program recovery technique based on determining an amount of time involved in applying update patches, according to further examples.

FIG. 3 is a flow diagram of a selective restoration process performed by the selective restoration engine 134, according to further examples of the present disclosure. In other examples, the tasks of FIG. 3 can be performed in a different order, some tasks may be omitted, and other tasks may be added.

The selective restoration engine 134 receives (at 302) a request to initiate a recovery of the VM 112 (or more generally, a request for recovery of a program in the computer system 102). The selective restoration engine 134 determines (at 304) whether the recovery copies 110 in the backup storage system 108 are valid (similar to the determination at 204 in FIG. 2).

If the selective restoration engine 134 determines (at 304) that the recovery copies 110 are not valid, the selective restoration engine 134 returns (at 306) an error, and the restoration process stops.

On the other hand, if the selective restoration engine 134 determines (at 304) that there is at least one valid recovery copy 110, the selective restoration engine 134 proceeds with the recovery process. The selective restoration engine 134 selects one of different program restoration techniques to use based on an estimation of a time involved in applying one or more of the update patches to a restored version of the VM 112 (or more generally, to a restored version of a program in the computer system 102).

The selective restoration engine 134 calculates (at 306) a restore time ($T_{RESTORE}$) that would be involved for restoring the VM 112 from the recovery copy 110. $T_{RESTORE}$ is the sum of the time involved in extracting the information (including machine-readable instructions and data) from the recovery copy 110, the time involved in loading the machine-readable instructions into the VM 112, and the time involved in loading the data to the data disk 150 of the primary storage system 106.

The calculation of $T_{RESTORE}$ can be based on the size of the recovery copy 110 (the larger the size of the recovery copy 110 the more time would be involved to read the information of the recovery copy 110), the operational speed of the backup storage system 108 (which affects how quickly the information can be read from the backup storage system 108), a rate of communications over a network (which affects how quickly information can be transferred among the computer system 102, the backup storage system 108, and the primary storage system 106), and the operational speed of the primary storage system 106 (which affects how quickly recovered data can be written to the primary storage system 106).

The selective restoration engine 134 calculates (at 308) an update time ($T_{PATCHES}$) involved in applying any update patches to the restored VM 112, as recovered from the recovery copy 110. As noted above, the selective restoration engine 134 identifies what patch updates are to be applied based on the program vulnerability information 146 and the instance of the program components metadata 148 for the recovery copy 110 from which the VM 112 is to be restored. The time $T_{PATCHES}$ to apply a collection of update patches is a sum of the times estimated to apply each update patch of the collection of update patches.

The size of each update patch is known. For example, the size of each update patch may be published by a source of the update patch and stored in the program vulnerability information 146 or as part of other metadata. In some cases, a source of an update patch may also provide an estimated time for applying the update patch. This estimated time can be used by the selective restoration engine 134 as the time involved in applying the update patch.

If the estimated time is not provided for an update patch, then the selective restoration engine 134 can estimate the time to apply the update patch based on the size of the update patch, a rate of communications over a network (which affects how quickly the update patch can be transferred to the computer system 102), and a type of the update patch (e.g., whether the update patch is for an application program, an OS, etc.), a capability of the computer system 102 (e.g., CPU capacity, memory capacity, storage capacity, etc.), and/or other factors. The type of update patch may affect how long it may take to apply the update patch. For example, an update patch for an OS may take longer than an update patch for an application program. A computer system with a greater CPU capacity and/or larger memory or storage may be able to apply an update patch more quickly than a computer system with a lower CPU capacity and/or smaller memory or storage.

The selective restoration engine 134 calculates (at 310) a disk recovery time ($T_{IMAGE}$) involved in recovering the VM 112 from code images on selected disks of the primary storage system 106, such as the application disk 152 and/or the OS disk 154. In some examples, recovering the VM 112 from code images on disks can be based on a disk-level recovery technology provided by the hypervisor 116. The hypervisor 116 provides mechanisms to over-write or re-create disks of VMs. A recovery process can use such mechanisms to restore selected disks of a VM.

Note that if the selective restoration engine 134 is aware that the guest OS 120 is operating correctly, then the selective restoration engine 134 can choose to not recover the guest OS 120 from the OS disk 154, but instead can recover from the application disk 152. In this latter case, $T_{IMAGE}$ is the time involved in recovering machine-readable instructions from the code image on the application disk 152. The time to recover the VM 112 from each disk of the primary storage system 106 may be provided by the hypervisor 116 to the selective restoration engine 134. Alternatively, the time to recover the VM 112 from each disk of the primary storage system 106 may be provided by a user to the selective restoration engine 134. In further examples, the selective restore engine 134 can compute the recovery time based on the size of a disk to be restored and a data transfer capacity of a network between the backup storage system 108 and the primary storage system 106. Further, the selective restore engine 134 can keep a record of restoration times and use the recorded restoration times for estimating the recovery time for recovering the VM 112 from a disk.

The selective restoration engine 134 determines (at 312) if $T_{RESTORE}+T_{PATCHES}<T_{IMAGE}$. If $T_{RESTORE}+T_{PATCHES}$ is not less than $T_{IMAGE}$, that means that recovering the VM 112 from the recovery copy 110 and applying any of the update patches would the same time or more time than performing a recovery of the VM 112 from selected disks of the primary storage system 106. In this case, the selective restoration engine 134 recovers (at 314) the VM 112 from the selected disks of the primary storage system 106. Note that recovering the VM 112 from the selected disks means that no update patches have to be applied, since the machine-readable instructions stored on the disks (e.g., 152 and/or 154) have already been previously patched.

On the other hand, if $T_{RESTORE}+T_{PATCHES}<T_{IMAGE}$, then the selective restoration engine 134 fully restores (at 316) the VM 112 from the recovery copy 110. After fully restoring the VM 112 from the selected recovery copy 110, the selective restoration engine 134 applies (at 318) patch updates to the program components used by the restored VM 112. After applying the patch updates, the restored VM 112 is available for use in the computer system 102.

In examples where multiple recovery copies 110 are available, the selective restoration engine 134 can determine which of the recovery copies 110 would be associated with the least amount of update time (based on application of patch updates). For example, the selective restoration engine 134 can determine that recovering the VM 112 from a first recovery copy 110 would result in application of a first collection of patch updates, that recovering the VM 112 from a second recovery copy 110 would result in application of a second collection of patch updates, and so forth. The selective restoration engine 134 can compute the update time for the first collection of patch updates, which is the sum of the times to apply the patch updates of the first collection of patch updates. The selective restoration engine 134 can compute the update time for the second collection of patch updates, which is the sum of the times to apply the patch updates of the second collection of patch updates. The selective restoration engine 134 compares the update times for the different collections of patch updates, and selects the recovery copy associated with the collection of patch updates having the least update time.

In further examples, the selective restoration engine 134 can consider the sum of $T_{RESTORE} + T_{PATCHES}$ for each recovery copy. For example, for recovery copy 1, $T_1 = T_{RESTORE\_1} + T_{PATCHES\_1}$ (where $T_{RESTORE\_1}$ is the time involved for restoring the VM 112 from recovery copy 1, and $T_{PATCHES\_1}$ is the time for applying any update patches to the restored VM 112 as recovered from recovery copy 1). For recovery copy 2, $T_2 = T_{RESTORE\_2} + T_{PATCHES\_2}$ (where $T_{RESTORE\_2}$ is the time involved for restoring the VM 112 from recovery copy 2, and $T_{PATCHES\_2}$ is the time for applying any update patches to the restored VM 112 as recovered from recovery copy 2). For recovery copy M (where $M \geq 2$), $T_M = T_{RESTORE\_M} + T_{PATCHES\_M}$ (where $T_{RESTORE\_M}$ is the time involved for restoring the VM 112 from recovery copy M, and $T_{PATCHES\_M}$ is the time for applying any update patches to the restored VM 112 as recovered from recovery copy M). The selective restoration engine 134 can compare $T_1, T_2, \ldots, T_M$ to find the minimum time from among $T_1, T_2, \ldots, T_M$, and select the recovery copy to use that is associated with the minimum time.

After the recovery copy is selected, the selective restoration engine 134 can proceed with tasks 306 to 318.

In alternative examples, the process of FIG. 2 can be modified to replace tasks 216 and 218 with tasks 306 to 318. In other words, in this modified process based on FIG. 2, if the selective restoration engine 134 determines (at 212) that the storage arrangement of the data 104 indicated by the storage arrangement information 144 matches a storage arrangement of data in any of the recovery copies 110, then the selective restoration engine 134 performs a time-based determination (according to a comparison of $T_{RESTORE} + T_{PATCHES}$ with $T_{IMAGE}$ in decision block 312) of whether to perform a full recovery (task 316) of the VM 112 from a recovery copy 110 or to perform a partial recovery (task 314) of the VM 112.

Figure 4:
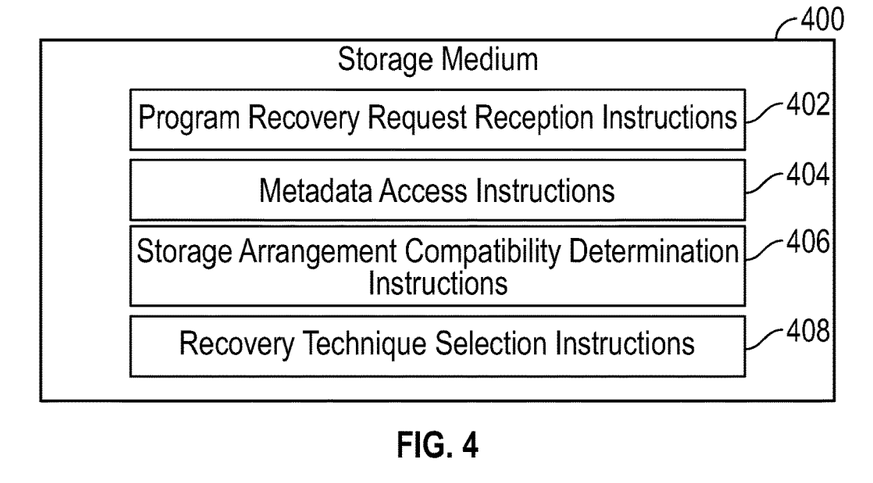
FIG. 4 is a block diagram of a storage medium storing machine-readable instructions according to some examples.

FIG. 4 is a block diagram of a non-transitory machine-readable storage medium or computer-readable storage medium storing machine-readable instructions that upon execution cause a system to perform various tasks. The system can be the backup/restore system 132 of FIG. 1, for example, or a different system.

The machine-readable instructions include program recovery request reception instructions 402 to receive a request to recover a program. The program to be recovered can be a VM (or a collection of VMs), or any other collection of programs.

The machine-readable instructions include metadata access instructions 404 to access metadata associated with a recovery copy of information for the program. An example of the metadata includes an instance of the program components metadata 148 of FIG. 1. The metadata includes information identifying program components used by the program, and versions of the program components. One of the program components is a data management module, such as a file system, a database server, a map-reduce system, or another type of data management module. In some examples, a version of the data management module indicates a storage arrangement of data included in a recovery copy.

The machine-readable instructions include storage arrangement compatibility determination instructions 406 to determine, based on the metadata, a compatibility of the storage arrangement of data in the recovery copy with the program. For example, the storage arrangement compatibility determination instructions 406 can determine, based on the metadata, a first version of the data management module in the recovery copy. The storage arrangement compatibility determination instructions 406 further determine a second version of the data management module used by a current version of the program at the time the program recovery request was received. The storage arrangement compatibility determination instructions 406 compare the first version to the second version of the data management module to determine the compatibility of the storage arrangement of data in the recovery copy with the program.

The machine-readable instructions include recovery technique selection instructions 408 to determine, based on the determined compatibility, whether to fully recover the program using the recovery copy or to partially recover the program.

In some examples, the recovery technique selection instructions 408 determine that the partial recovery of the program is to be performed based on determining that the storage arrangement of the data in the recovery copy is incompatible with the program.

In some examples, the recovery technique selection instructions 408 determine that the partial recovery of the program is to be performed further based on determining that machine-readable instructions for a program component used by the program are uncorrupted.

In further examples, the recovery technique selection instructions 408 determine that the partial recovery of the program is to be performed based on: determining that the storage arrangement of the data in the recovery copy is compatible with the program, calculating a time involved in applying one or more updates to the program after the full recovery of the program from the recovery copy, and based on the calculated time, determining that fully recovering the program using the recovery copy in combination with applying the one or more updates is less time efficient than recovering the program from an image of a program component used by the program (e.g., $T_{RESTORE} + T_{PATCHES} \geq T_{IMAGE}$).

In some examples, the partial recovery of the program includes recovering raw data in the recovery copy without recovering machine-readable instructions of a data management module from the recovery copy.

In some examples, the recovery technique selection instructions 408 determine that the full recovery of the program is to be performed using the recovery copy based on determining that the storage arrangement of the data in the recovery copy is compatible with the program.

In some examples, determining that the full recovery of the program is to be performed using the recovery copy is further based on: calculating a time (e.g., $T_{PATCHES}$)

involved in applying one or more updates to the program after the full recovery of the program from the recovery copy, and based on the calculated time, determining that fully recovering the program using the recovery copy in combination with applying the one or more updates is more time efficient than recovering the program from an image of a program component used by the program.

In some examples, determining that the full recovery of the program is to be performed using the recovery copy is further based on: calculating a time (e.g., $T_{RESTORE}$) involved in restoring the program from the recovery copy, combining the time (e.g., $T_{PATCHES}$) involved in applying the one or more updates and the time (e.g., $T_{RESTORE}$) involved in restoring the program from the recovery copy to produce an aggregate time. Combining the times can refer to summing the times or calculating another mathematical aggregate of the times (e.g., weighted sum, etc.). Based on the aggregate time, the recovery technique selection instructions 408 determine that fully recovering the program using the recovery copy in combination with applying the one or more updates is more time efficient than recovering the program from the image of the program component used by the program (e.g., $T_{RESTORE}+T_{PATCHES}<T_{IMAGE}$).

In some examples, the machine-readable instructions store version information regarding a version of the program component used by the program, as part of creating the recovery copy of information for the program. The machine-readable instructions identify, based on program vulnerability information associated with the program component and the version information, the one or more updates to apply after recovering the program using the recovery copy.

Figure 5:
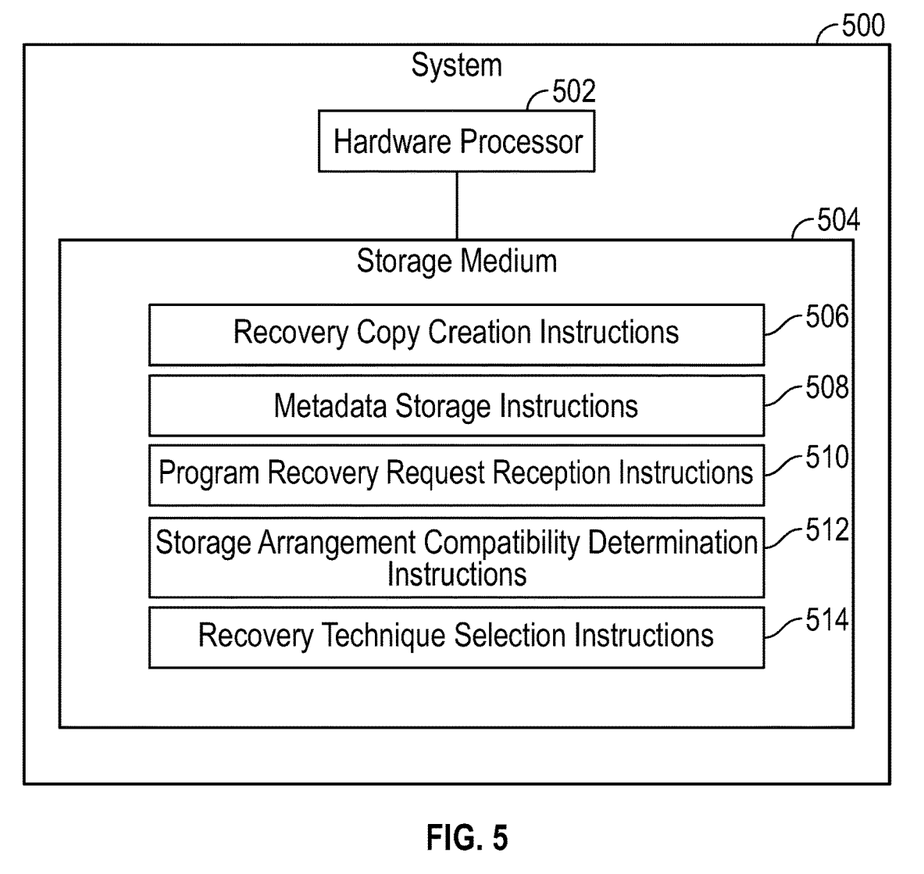
FIG. 5 is a block diagram of a system according to some examples.

FIG. 5 is a block diagram of a system 500 according to some examples. The system 500 can be the backup/restore system 132 of FIG. 1 or another system implemented with one or more computers. The system 500 includes a hardware processor 502 (or multiple hardware processors). A hardware processor can include a microprocessor, a core of a multi-core microprocessor, a microcontroller, a programmable integrated circuit, a programmable gate array, or another hardware processing circuit.

The system 500 further includes a storage medium 504 storing machine-readable instructions executable on the hardware processor 502 to perform various tasks. Machine-readable instructions executable on a hardware processor can refer to the machine-readable instructions executable on a single hardware processor or the instructions executable on multiple hardware processors.

The machine-readable instructions in the storage medium 504 include recovery copy creation instructions 506 to create a recovery copy of a state of a program. The machine-readable instructions in the storage medium 504 include metadata storage instructions 508 to store, in a memory, metadata associated with a recovery copy, the metadata including information of a version of a program component used by the program.

The machine-readable instructions in the storage medium 504 include program recovery request reception instructions 510 to receive a request to recover the program. The request may be received from a user or another entity.

The machine-readable instructions in the storage medium 504 include storage arrangement compatibility determination instructions 512 to determine, based on the metadata, a compatibility of a storage arrangement of data in the recovery copy with the program.

The machine-readable instructions in the storage medium 504 include recovery technique selection instructions 514 to, based on the determined compatibility, determine whether to fully recover the program using the recovery copy or to partially recover the program using an image of the program component.

In some examples, the recovery technique selection instructions 514 determine that the full recovery of the program is to be performed using the recovery copy is based on determining that the storage arrangement of the data in the recovery copy is compatible with the program, calculating a first time involved in applying one or more updates to the program after the full recovery of the program from the recovery copy, and based on the first time, determining that fully recovering the program using the recovery copy in combination with applying the one or more updates is more time efficient than recovering the program from the image of the program component used by the program.

In some examples, the recovery copy is a first recovery copy. The recovery technique selection instructions 514 determine that the full recovery of the program is to be performed using the first recovery copy is based on: calculating a second time involved in applying one or more updates to the program after a full recovery of the program from a second recovery copy of a state of a program, and determining, based on the first time and the second time, that fully recovering the program using the first recovery copy is more time efficient than fully recovering the program using the second recovery copy.

Figure 6:
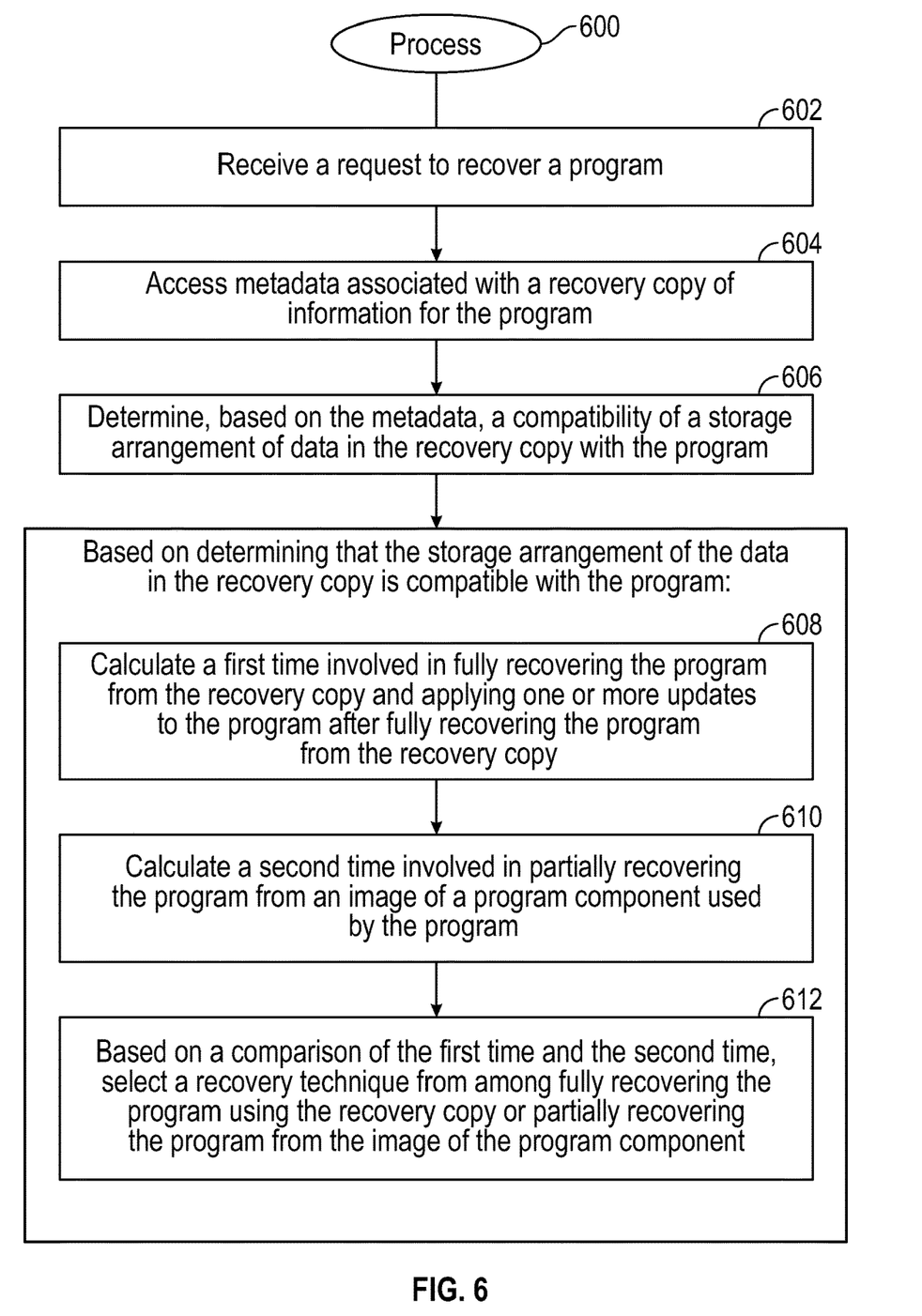
FIG. 6 is a flow diagram of a process according to some examples.

FIG. 6 is a flow diagram of a process 600 according to some examples. The process 600 can be performed by the backup/restore system 132, for example.

The process 600 includes receiving (at 602) a request to recover a program. The process 600 includes accessing (at 604) metadata associated with a recovery copy of information for the program. The metadata includes information identifying program components used by the program, and versions of the program components.

The process 600 includes determining (at 606), based on the metadata, a compatibility of a storage arrangement of data in the recovery copy with the program. The process 600 performs tasks 608 to 612 based on determining that the storage arrangement of the data in the recovery is compatible with the program.

Task 608 includes calculating a first time (e.g., $T_{RESTORE}+T_{PATCHES}$) involved in fully recovering the program from the recovery copy and applying one or more updates to the program after fully recovering the program from the recovery copy.

Task 610 includes calculating a second time (e.g., $T_{IMAGE}$) involved in partially recovering the program from an image of a program component used by the program.

Task 612 includes based on a comparison of the first time and the second time, selecting a recovery technique from among fully recovering the program using the recovery copy or partially recovering the program from the image of the program component.

A storage medium (e.g., 400 in FIG. 4) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   receive a request to recover a program;
   access metadata associated with a recovery copy of information for the program;
   determine, based on the metadata, a compatibility of a storage arrangement of data in the recovery copy with the program; and
   determine whether to fully recover the program using the recovery copy or to partially recover the program based on the determined compatibility;
   wherein determining that the partial recovery of the program is to be performed is based on:
      determining that the storage arrangement of the data in the recovery copy is compatible with the program;
      calculating a time involved in applying one or more updates to the program after the full recovery of the program from the recovery copy; and
      based on the calculated time, determining that fully recovering the program using the recovery copy in combination with applying the one or more updates is less time efficient than recovering the program from an image of a program component used by the program.

2. The non-transitory machine-readable storage medium of claim 1, wherein determining that the partial recovery of the program is to be performed is based on determining that the storage arrangement of the data in the recovery copy is incompatible with the program.

3. The non-transitory machine-readable storage medium of claim 2, wherein determining that the partial recovery of the program is to be performed is further based on:
   determining that machine-readable instructions for a program component used by the program are uncorrupted.

4. The non-transitory machine-readable storage medium of claim 1, wherein the storage arrangement of the data in the recovery copy is according to a version of a data management module in the recovery copy, the data management module to manage access of data in a storage system.

5. The non-transitory machine-readable storage medium of claim 1, wherein the storage arrangement of the data in the recovery copy is according to a version of a file system in the recovery copy.

6. The non-transitory machine-readable storage medium of claim 1, wherein the storage arrangement of the data in the recovery copy is according to a version of a database server in the recovery copy.

7. The non-transitory machine-readable storage medium of claim 1, wherein the determining of the compatibility of the storage arrangement of the data in the recovery copy with the program is based on comparing the storage arrangement of the data in the recovery copy with a storage arrangement of data stored in a storage system used by the program.

8. The non-transitory machine-readable storage medium of claim 7, wherein the partial recovery of the program comprises recovering raw data in the recovery copy without recovering machine-readable instructions of a data management module from the recovery copy.

9. The non-transitory machine-readable storage medium of claim 1, wherein determining that the full recovery of the program is to be performed using the recovery copy is based on determining that the storage arrangement of the data in the recovery copy is compatible with the program.

10. The non-transitory machine-readable storage medium of claim 9, wherein determining that the full recovery of the program is to be performed using the recovery copy is further based on:
    calculating a time involved in applying one or more updates to the program after the full recovery of the program from the recovery copy, and
    based on the calculated time, determining that fully recovering the program using the recovery copy in combination with applying the one or more updates is more time efficient than recovering the program from an image of a program component used by the program.

11. The non-transitory machine-readable storage medium of claim 10, wherein determining that the full recovery of the program is to be performed using the recovery copy is further based on:
    calculating a time involved in restoring the program from the recovery copy, and
    combining the time involved in applying the one or more updates and the time involved in restoring the program from the recovery copy to produce an aggregate time, and
    based on the aggregate time, determining that fully recovering the program using the recovery copy in combination with applying the one or more updates is more time efficient than recovering the program from the image of the program component used by the program.

12. The non-transitory machine-readable storage medium of claim 11, wherein determining that the full recovery of the program is to be performed using the recovery copy is further based on:
    calculating a time to perform the partial recovery of the program that comprises recovering the program from the image of the program component, and
    determining that the aggregate time does not exceed the time to perform the partial recovery.

13. The non-transitory machine-readable storage medium of claim 10, wherein the instructions upon execution cause the system to:

as part of creating the recovery copy of information for the program, store version information regarding a version of the program component used by the program;

identify, based on program vulnerability information associated with the program component and the version information, the one or more updates to apply after recovering the program using the recovery copy.

14. The non-transitory machine-readable storage medium of claim 1, wherein the instructions upon execution cause the system to:

responsive to determining that the program is to be fully recovered using the recovery copy:
  recover the program to a prior state using the recovery copy, and
  apply one or more update patches to the program recovered to the prior state.

15. A system comprising:

a hardware processor; and a non-transitory machine-readable storage medium storing instructions executable on the hardware processor to:
  create a recovery copy of a state of a program;
  store, in a memory, metadata associated with a recovery copy, the metadata comprising information of a version of a program component used by the program;
  receive a request to recover the program;
  determine, based on the metadata, a compatibility of a storage arrangement of data in the recovery copy with the program; and
  based on the determined compatibility, determine whether to fully recover the program using the recovery copy or to partially recover the program using an image of the program component,
  wherein determining that the full recovery of the program is to be performed using the recovery copy is based on:
    determining that the storage arrangement of the data in the recovery copy is compatible with the program;
    calculating a first time involved in applying one or more updates to the program after the full recovery of the program from the recovery copy; and
    based on the first time, determining that fully recovering the program using the recovery copy in combination with applying the one or more updates is more time efficient than recovering the program from the image of the program component used by the program.

16. The system of claim 15, wherein the recovery copy is a first recovery copy, and wherein determining that the full recovery of the program is to be performed using the first recovery copy is based on:

calculating a second time involved in applying one or more updates to the program after a full recovery of the program from a second recovery copy of a state of a program, and determining, based on the first time and the second time, that fully recovering the program using the first recovery copy is more time efficient than fully recovering the program using the second recovery copy.

17. A method comprising:

receiving, at a system comprising a hardware processor, a request to recover a program;

accessing, by the system, metadata associated with a recovery copy of information for the program;

determining, based on the metadata, a compatibility of a storage arrangement of data in the recovery copy with the program; and based on determining that the storage arrangement of the data in the recovery copy is compatible with the program:
  calculating a first time involved in fully recovering the program from the recovery copy and applying one or more updates to the program after fully recovering the program from the recovery copy,
  calculating a second time involved in partially recovering the program from an image of a program component used by the program, and
  based on a comparison of the first time and the second time, selecting, by the system, a recovery technique from among fully recovering the program using the recovery copy or partially recovering the program from the image of the program component.

18. The method of claim 17, wherein the recovery copy comprises data and executable machine-readable instructions for the program.

* * * * *